United States Patent [19]

Banthin

[11] 4,095,417
[45] Jun. 20, 1978

[54] APPARATUS FOR AND METHOD OF SUPPRESSING INFRARED RADIATION EMITTED FROM GAS TURBINE ENGINE

[75] Inventor: Clifford R. Banthin, Easton, Conn.

[73] Assignee: Avco Corporation, Wilmington, Mass.

[21] Appl. No.: 716,396

[22] Filed: Aug. 23, 1976

[51] Int. Cl.$^2$ ............................................. F02C 7/18
[52] U.S. Cl. .................................. 60/39.5; 60/39.66; 60/264; 239/127.3; 239/265.17
[58] Field of Search ..................... 60/39.5, 39.66, 271, 60/264; 239/127.3, 265.17

[56] References Cited

U.S. PATENT DOCUMENTS

| | | | |
|---|---|---|---|
| 3,210,934 | 10/1965 | Smale | 60/39.5 |
| 3,802,187 | 4/1974 | Titus | 60/271 |
| 3,815,360 | 6/1974 | Wellinitz | 60/39.5 |
| 4,007,587 | 2/1977 | Banthin et al. | 60/39.5 |
| 4,018,046 | 4/1977 | Hurley | 60/264 |

*Primary Examiner*—Robert E. Garrett

*Attorney, Agent, or Firm*—Irwin P. Garfinkle; Joseph V. Tassone; Ralph D. Gelling

[57] ABSTRACT

An apparatus for and method of suppressing infrared radiation emitted from hot metal parts at the aft end of a gas turbine engine and from the exhaust gas plume thereof during engine operation is provided and comprises a multiple purpose ejector vane assembly operatively attached to the engine for introducing cooling ambient air into the hot engine exhaust gases and hiding the hot metal parts and means attaching the vane assembly to the engine with the vane assembly comprising a duct structure for receiving and confining the engine exhaust gases and a plurality of radial ejector vanes supported by the duct structure for introducing cooling ambient air into hot engine exhaust gases during engine operation by ejector action while simultaneously imparting a spiral swirl to both the cooling ambient air and the exhaust gases with the swirl promoting mixing of ambient air within the duct structure and causing additional entrainment of ambient air downstream of the duct structure.

25 Claims, 16 Drawing Figures

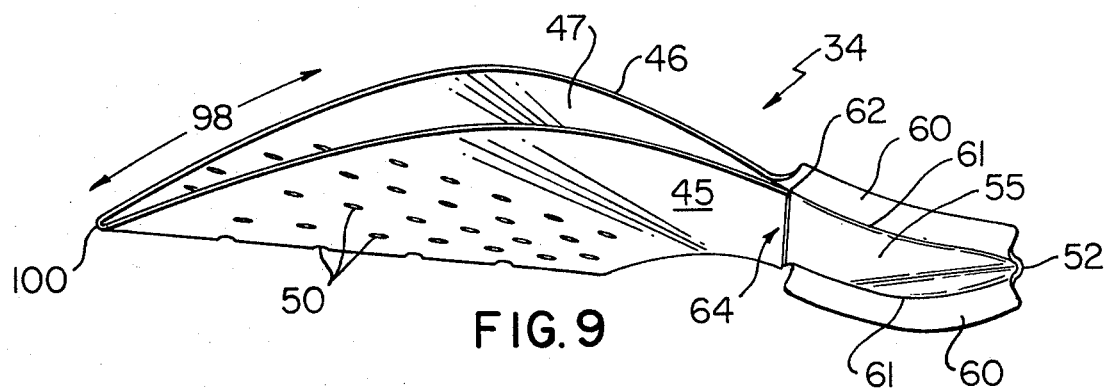
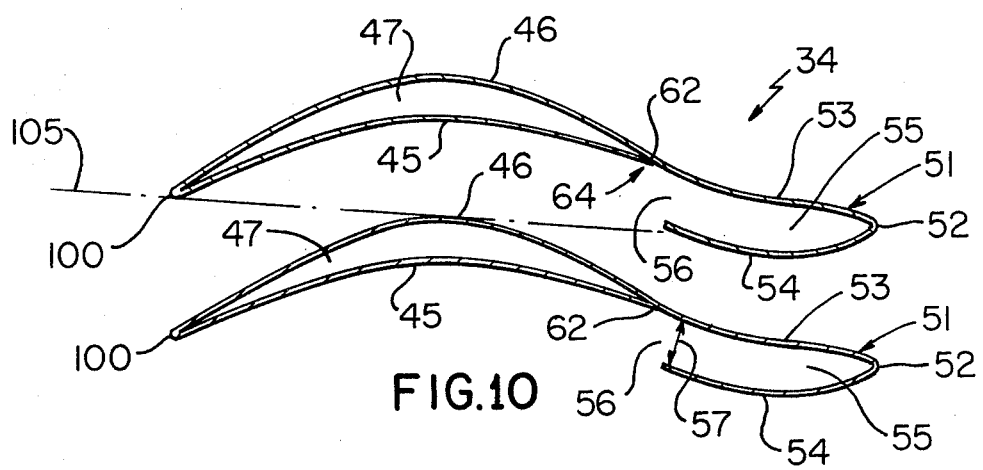
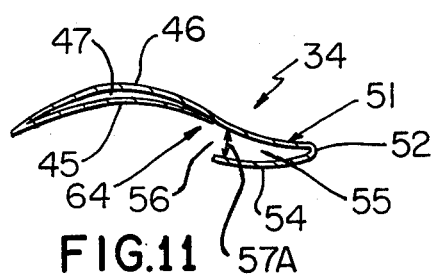
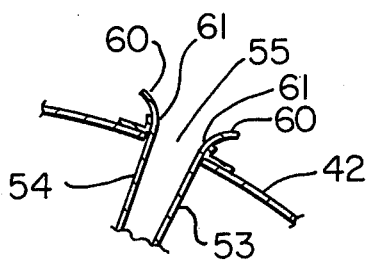
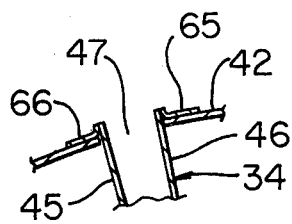
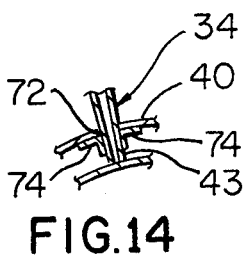

APPARATUS FOR AND METHOD OF SUPPRESSING INFRARED RADIATION EMITTED FROM GAS TURBINE ENGINE

BACKGROUND OF THE INVENTION

Many military aircraft are powered by gas turbine engines which ordinarily emit infrared radiation from exposed hot metal parts and from hot exhaust gas plumes thereof whereby such aircraft are particularly vulnerable to missiles which seek and home on such infrared radiation. Further, in military helicopter aircraft powered by gas turbines, suppression of infrared radiation is required under conditions of hover or relatively low flight speeds where ram air is not available for cooling.

Infrared radiation suppressors are known; however, the suppressors proposed heretofore have certain deficiencies in that they either require air pumps, or the like, to provide cooling air at a substantial engine power loss or weight penalty, complex heat transfer panel designs, comparatively large installation space, complex ducting, or additional aircraft mounts to support the weight thereof making such suppressors undesirable in many aircraft applications.

Accordingly, there is a need for a simple and economical apparatus and method for suppressing infrared radiation emitted from hot metal parts at the aft end of a gas turbine engine and from the exhaust gas plume thereof which overcome the above-mentioned deficiencies.

SUMMARY

It is a feature of this invention to provide a simple, economical, and reliable method of suppressing infrared radiation emitted from hot metal parts at the aft end of the gas turbine engine and from the exhaust gas plume thereof during engine operation.

Another feature of this invention is to provide an apparatus for and method of suppressing infrared radiation which utilizes adjustable components which may be fixed in position and provide radiation suppression with minimum drain of engine power.

Another feature of this invention is to provide an apparatus for and method of suppressing infrared radiation which employs a unique multiple purpose vane assembly capable of operating under loads of the order of ten times the force of gravity (10 G's) yet which may be supported solely by the engine structure.

Another feature of this invention is to provide an apparatus for and method of suppressing infrared radiation which utilizes a multiple purpose vane assembly which imparts a spiral swirl to cooling ambient air introduced by ejector action and to exhaust gases associated therewith with such spiral swirl serving to accelerate cooling of the engine exhaust gases.

Another feature of this invention is to provide an apparatus for and method of suppressing infrared radiation emitted from hot metal parts at the aft end of a gas turbine engine and from the exhaust gas plume thereof during engine operation wherein the apparatus comprises a multiple purpose ejector vane assembly operatively attached to the engine for introducing cooling ambient air into the hot engine exhaust gases and hiding the hot metal parts and means attaching the vane assembly to the engine with the vane assembly comprising a duct structure for receiving and confining the engine exhaust gases and a plurality of radial ejector vanes supported by the duct structure for introducing cooling ambient air into the hot engine exhaust gases during engine operation by ejector action while simultaneously imparting a spiral swirl to both the cooling ambient air and exhaust gases with the swirl promoting mixing of ambient air within the duct structure and causing additional entrainment of ambient air downstream of such duct structure.

Therefore, it is an object of this invention to provide an apparatus for and method of suppressing infrared radiation emitted from hot metal parts at the aft end of a gas turbine engine and from the exhaust gas plume thereof during engine operation having one or more of the novel features set forth above or hereinafter shown or described.

Other objects, features, details, uses, and advantages of this invention will become apparent from the embodiments thereof presented in the following specification, claims, and drawings.

BRIEF DESCRIPTION OF THE DRAWINGS

The accompanying drawings show present preferred embodiments of this invention, in which

FIG. 9 is a top view of a typical vane of the vane assembly minus adjoining structure and looking toward the axis of the vane assembly with the vane installed in position on such vane assembly;

FIG. 10 is a cross-sectional view taken essentially on the line 10—10 of FIG. 2 and particularly illustrating a line of sight from the rear of the ejector vane assembly toward the engine and highlighting the total concealment of the hot metal parts at the aft end of the engine;

FIG. 11 is a cross-sectional view taken essentially on the line 11—11 of FIG. 2;

FIG. 12 is a fragmentary cross-sectional view taken essentially on the line 12—12 of FIG. 2;

FIG. 13 is a fragmentary cross-sectional view taken essentially on the line 13—13 of FIG. 2; and FIG. 14 is a fragmentary cross-sectional view taken essentially on the line 14—14 of FIG. 2.

DESCRIPTION OF ILLUSTRATED EMBODIMENTS

Figure 1:
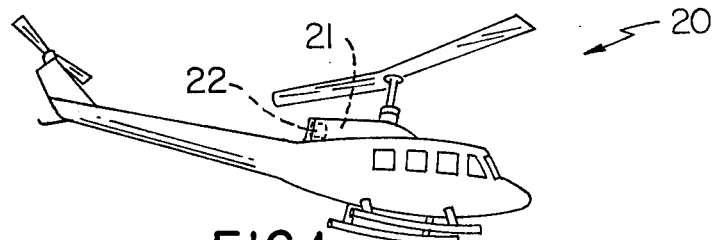
FIG. 1 is a perspective view illustrating a helicopter aircraft which utilizes the apparatus and method of this invention for suppressing infrared radiation.
Figure 2:
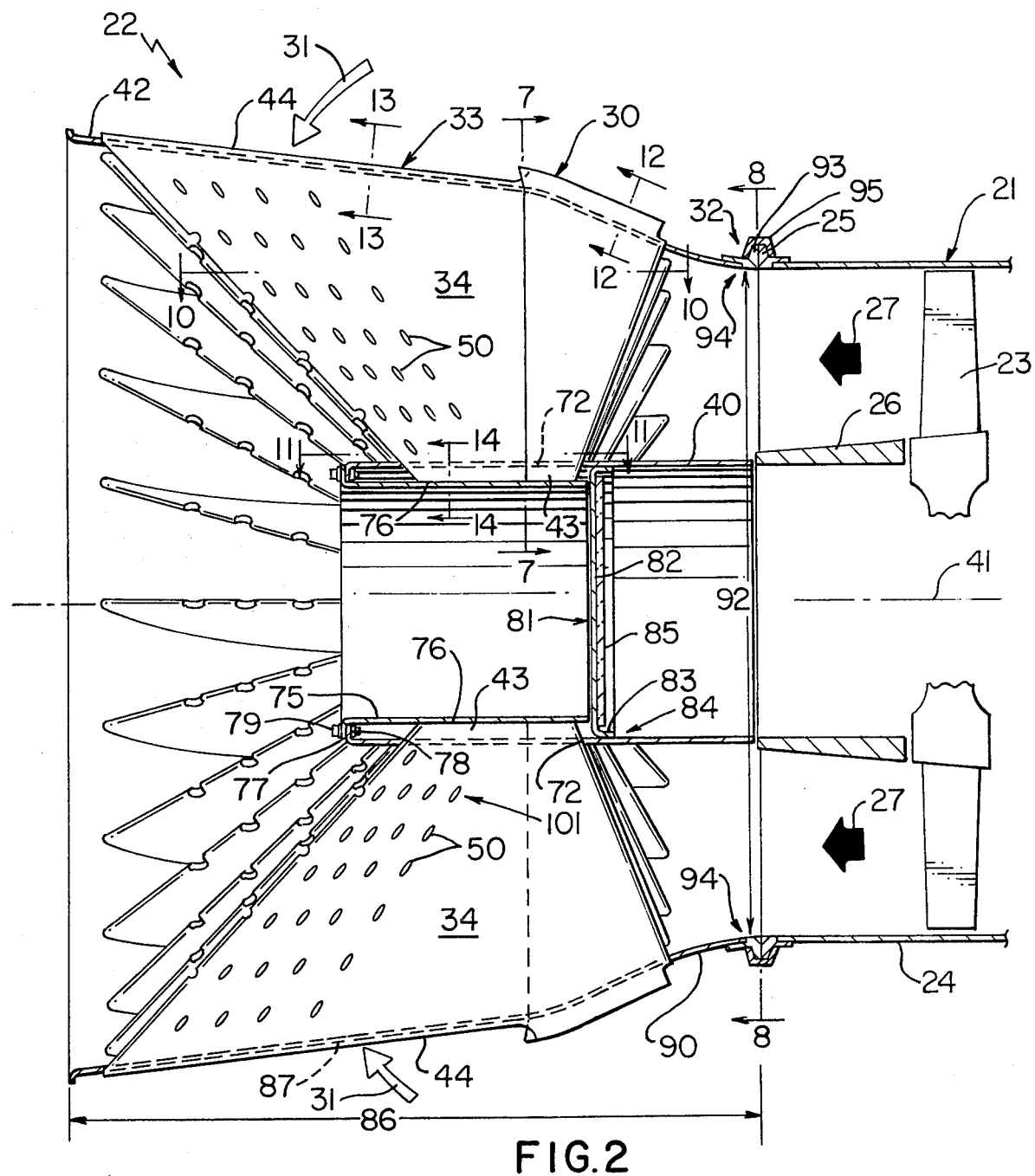
FIG. 2 is a view with parts in cross section, parts in elevation, and parts broken away particularly illustrating details of such apparatus and method as employed on the helicopter of FIG. 1 and particularly illustrating the manner in which the apparatus is supported solely by the engine structure.
Figure 3:
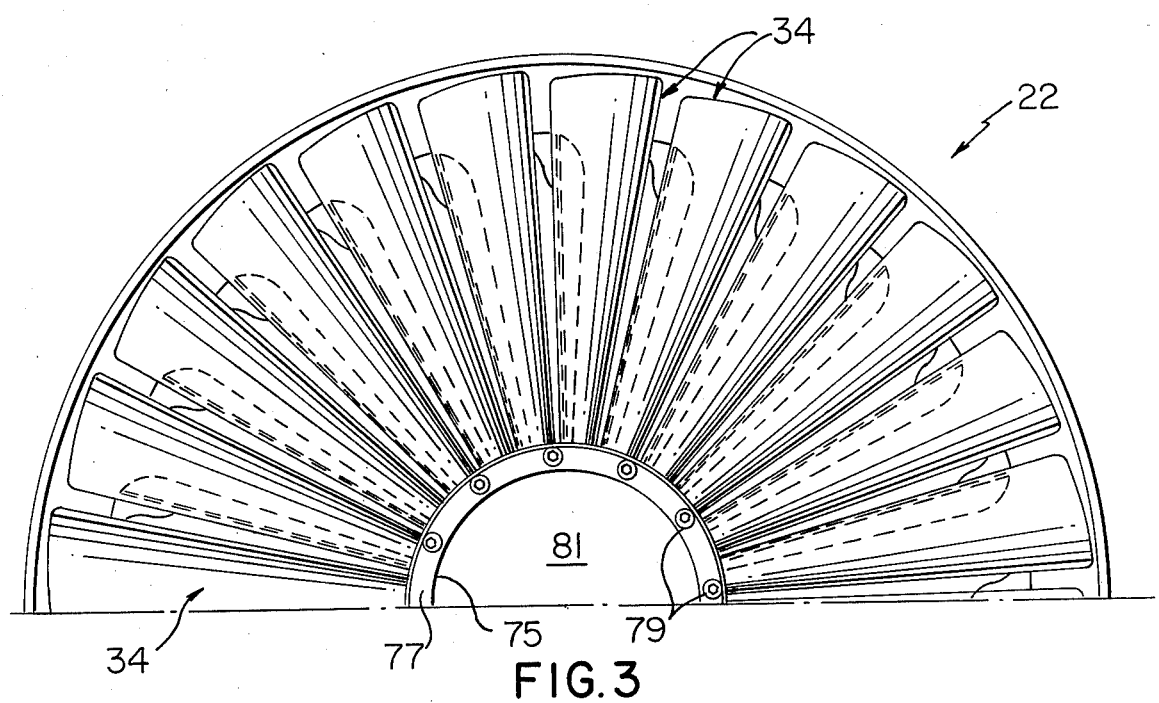
FIG. 3 is a view of the upper half of the suppressor looking perpendicularly toward the rear thereof.

Reference is now made to FIG. 1 of the drawings which illustrates an exemplary aircraft in the form of a helicopter 20 which utilizes a gas turbine engine 21 as its main source of power and the engine 21 employs an exemplary apparatus and method of this invention designated generally by the reference numeral 22, see FIG. 2, for suppressing infrared radiation emitted from hot metal parts at the aft end of the gas turbine engine 21 and from the exhaust gas plume thereof. The engine 21 has the usual turbine 23 at its aft end and has a tubular housing 24 surrounding the turbine and extending rearwardly thereof and the housing 24 has an annular mounting ring 25 of substantially L-shaped cross-sectional configuration suitably fixed thereto by welding, or the like. The engine 21 also has a tubular transition member 26 suitably supported downstream of the turbine 23 and the member 26 cooperates with the housing 24 to confine the exhaust gases discharging the turbine 23 to define a tubular stream with the exhaust gases being designated generally by solid arrows 27.

The apparatus 22 comprises a multiple purpose ejector vane assembly 30 which is operatively attached to the engine 21 for introducing cooling ambient air, indicated schematically by hollow arrows 31, into the hot engine exhaust gases and hiding the hot metal parts of the gas turbine engine and such apparatus comprises means attaching the vane assembly 30 to the engine and such attaching means is designated generally by the reference numeral 32 in FIG. 2 and such attaching means will be described in detail subsequently.

Figure 4:
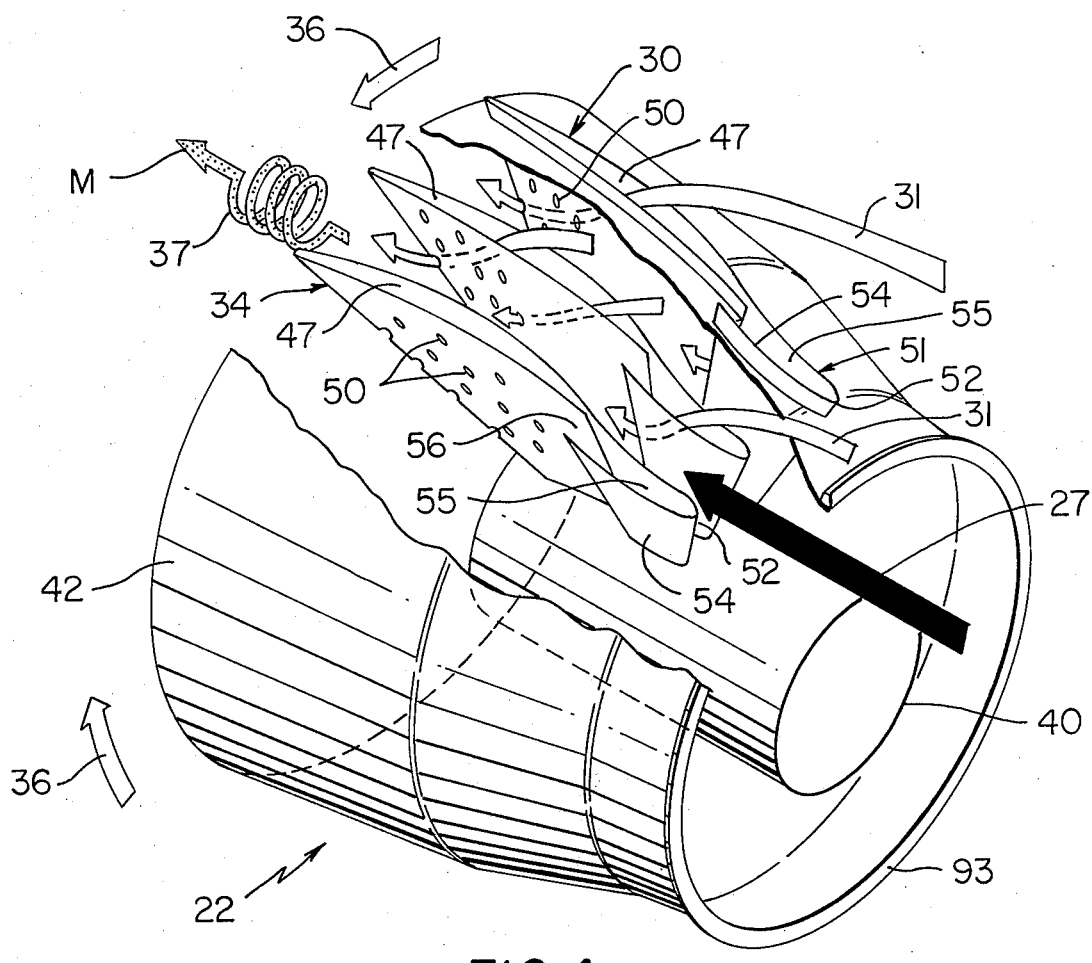
FIG. 4 is a primarily schematic perspective view of the apparatus and method of this invention with certain parts broken away illustrating certain details of the vanes of the vane assembly and the spiral twist imparted to engine exhaust gases and cooling ambient air by the ejector vane assembly.

The vane assembly 30 comprises a duct structure 33 for receiving and confining the engine exhaust gases and a plurality of substantially identical radial ejector vanes 34 supported by the duct structure for introducing cooling ambient air into the hot engine exhaust gases during engine operation by ejector action while simultaneously imparting a spiral swirl to both the cooling ambient air and the exhaust gases with the swirl promoting mixing of ambient air within the confines of the duct structure 33 (with such confines being defined as the axial length of such structure, its inner surface portions, and its outer periphery) as well as causing additional entrainment of cooling ambient air downstream of the duct structure as indicated by hollow arrows 36 in FIG. 4. The spiral swirl is indicated schematically by the dotted spiral arrow 37, with the dots indicating the mixture M of ambient air and hot exhaust gases.

As seen particularly in FIG. 2 of the drawings, the duct structure 33 comprises an inner tubular support 40 having a central longitudinal axis 41 which is also the axis of the vane assembly 30 and an outer tubular support 42 disposed concentrically about the inner support 40 and having an axis which is common with the axis 41 and each of the plurality of radial vanes 34 is supported by the tubular supports 40 and 42 adjacent its opposed end portions 43 and 44 respectively.

As best seen in FIG. 9 of the drawings, each vane 34 is comprised of cooperating curved wall means and such curved wall means is defined by aft wall portions 45 and 46. The aft wall portions 45 and 46 cooperate to define a passage 47 disposed transverse the axis 41 and basically substantially perpendicular to such axis for the purpose of receiving cooling ambient air therethrough by ejector action.

The aft wall portions 45 and 46 have a plurality of apertures therein each designated by the same reference numeral 50 for discharging the cooling ambient air 31 from within each passage 47 and mixing thereof with the exhaust gases 27. Each of the apertures 50 serves to introduce a jet-like stream of cooling ambient air 31 into the exhaust gases 27 to define a plurality of jet-like streams associated with aft wall means or aft wall portions of a particular vane which cooperate to initially define a radially extending or disposed blanket or cooling ambient air which is initially disposed between the inner tubular support 40 and the outer tubular support 42. The aft wall portions 45 and 46 of each vane 34 cooperate to define the transverse passage 47 which has a roughly flattened crescent shape at each cross section thereof which is parallel to the axis 41 and as indicated in FIGS. 9, 10 and 11, it will be seen that the passage 47 decreases in area as each of its cross sections taken parallel to the axis 41 approaches such axis.

The curved wall means of each vane 34 also comprise a roughly V-shaped forward wall portion 51 with each V-shaped portion having an apex 52 which is convex toward the engine 21 and a first leg 53 adjoining the apex 52 and being fixed to an associated aft wall portion shown as curved aft wall portion 46 in this example and it will be seen that the leg 53 adjoins curved wall portion 46 and blends smoothly therewith as an integral part thereof. The V-shaped forward wall portion 51 has a second leg 54 which is adjustably fixed to define a second passage designated generally by the reference numeral 55 in each vane 34 for introducing cooling ambient air therethrough. Each second passage 55 has an outlet opening 56 which has a slightly tapering or decreasing width radially inwardly along the radial height of its vane and as shown at exemplary locations 57 and 57A in FIGS. 10 and 11 respectively.

Figure 7:
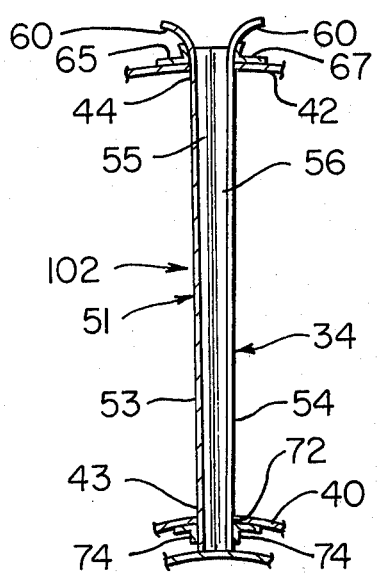
FIG. 7 is a fragmentary cross-sectional view taken essentially on the line 7—7 of FIG. 2 particularly illustrating a typical second passage in a typical vane of the vane assembly with the second passage having an outlet opening which has a slightly decreasing width radially inwardly along the height of its vane perpendicular to the axis of the vane assembly.
Figure 8:
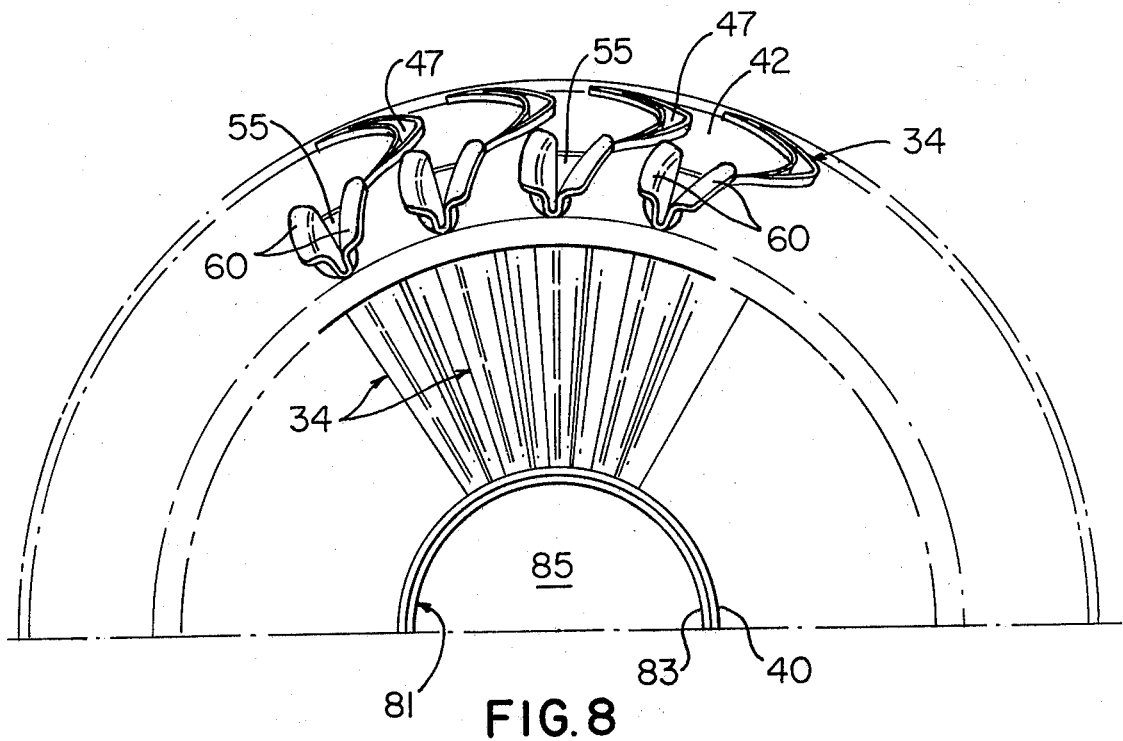
FIG. 8 is a view of the upper half portion of the ejector vane assembly looking perpendicularly toward the inlet to such vane assembly and illustrating only four typical vanes thereof.

The V-shaped forward wall portion 51 of each vane 34 also has outwardly flaring inlet flanges 60 for smooth introduction of cooling ambient air into the second passage 55, see FIGS. 7, 8, and 12. The outwardly flaring inlet flanges 60 are connected with their associated walls 53 and 54 on smooth arcuate portions 61.

Although each vane 34 may be made of a plurality of component parts it will be seen that such vane, including its V-shaped forward portion 51, aft wall portions 45 and 46, flanges 60, and interconnecting portions, is defined as a single-piece construction. Accordingly, leg portion 53 and aft wall portion 46 blend smoothly together as a single-piece on a common interconnecting portion 62; and, the upstream edge of curved wall portion 45 is fixed to the common portion 62 as indicated at 64 by any suitable means such as welding, or the like, see FIGS. 9 and 10.

Figure 5:
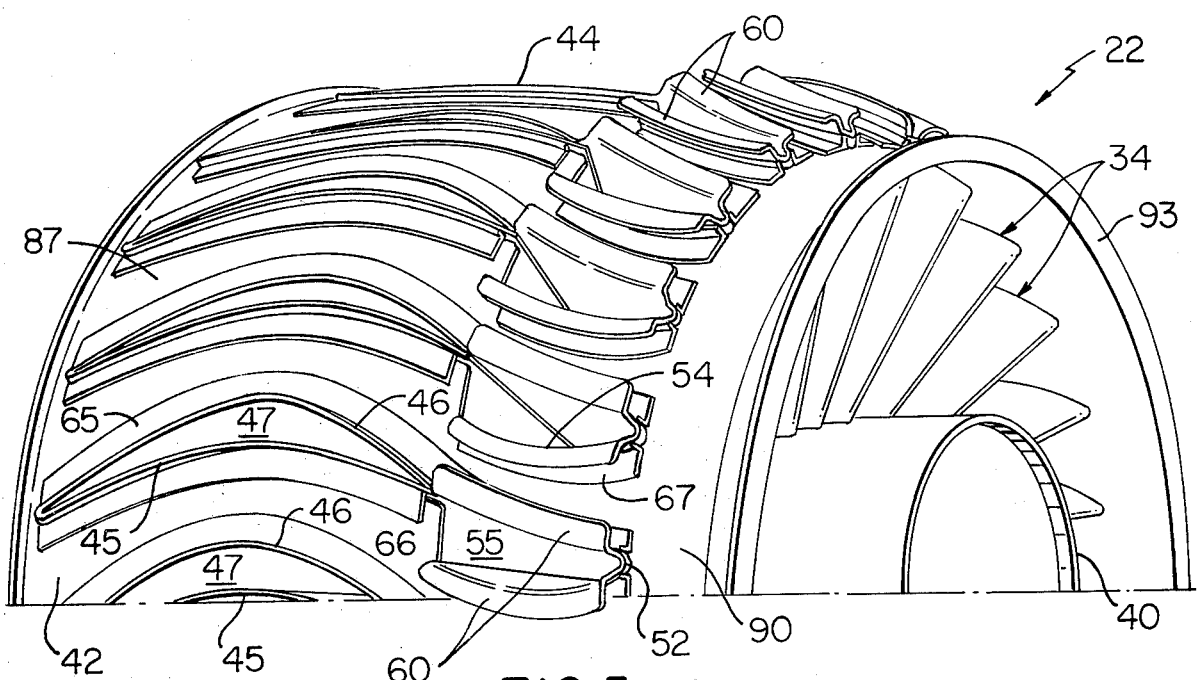
FIG. 5 is a perspective view of the upper half of the ejector vane assembly as viewed at an angle looking from the forward portion to the rear portion thereof.
Figure 6:
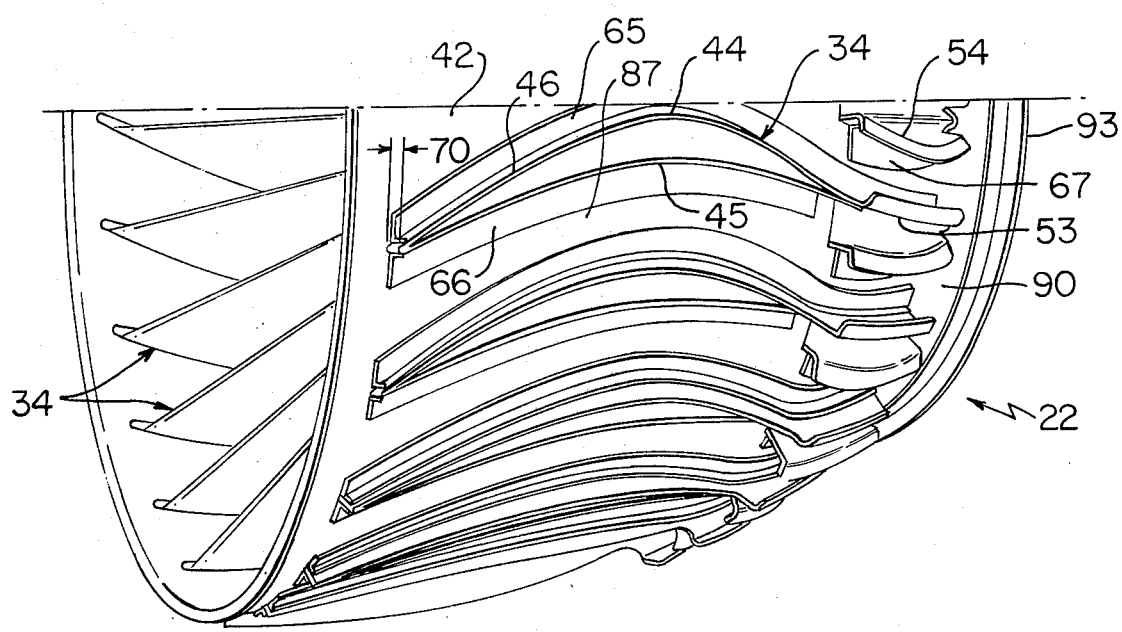
FIG. 6 is a perspective view of the lower half of the ejector vane assembly as viewed at an angle looking from the rear portion toward the forward portion thereof.

Each vane 34 may be made of any suitable material known in the art capable of being used to receive hot exhaust gases therethrough from the gas turbine engine 21 and it will also be seen from FIGS. 5 and 6 of the drawings that each end portion 44 of each vane 34 is fixed to the outer tubular support 42 by a plurality of suitably contoured L-shaped supporting flanges 65, 66, and 67. The flange 65 extends along the entire end edge portion of its vane 34 adjoining wall portion 46 and 53, the flange 66 adjoins wall portion 45, and the flange 67 adjoining wall portion 54. The flanges 65, 66, and 67 for each vane 34 are suitably fixed in position against the outer tubular support 42 by welding, or the like, and may be welded against their end portion 44 to support their end portion 44 firmly in position while providing a radial extension 70 of each vane 34 outwardly of the tubular support 42.

The inner end portion 43 of each vane 34 also extends through an associated opening 72 in the inner tubular support 40 whereby the edges of the tubular support 40 defining such opening prevent movement of the inner portion of the vane 34, see FIGS. 7 and 14. A plurality of L-shaped brackets 74 may also be fixed to the inside surface of the inner tubular support 40 by welding, or the like, and each inner end portion 43 welded to such brackets 74 to fix such inner portion 43 of each vane 34 firmly in position.

As seen in FIG. 2, the inner tubular support 40 has a cylindrical member 75 disposed therewithin in a telescopic manner coaxially therewith. The member 75 has an outside diameter dimensioned such that the outside cylindrical surface of such member is closely adjacent the inner edges 76 of the vanes 34. The cylindrical member 75 has an outturned annular flange or lip 77 and the inner tubular support 40 has an inturned annular flange or lip 78 each provided with a plurality of openings or holes which are disposed on a common diameter and each hole in lip 77 is aligned with a cooperating hole in lip 78 to define a set of holes. A plurality of nut and bolt assemblies 79 is provided and each assembly extends through an associated set of holes whereby the assemblies 79 fix the cylindrical member 75 within the tubular support 40 and provide added rigidity for the inner support 40. The tubular member 75 may also be dimensioned, if desired, so that the inner edges of the vanes 34 rest thereon to provide additional support for such vanes.

The inner tubular support 40 also has an upstream plug 81 which is defined by a flat circular disc 82 having an integral cylindrical flange 83 extending from the peripheral edge of the disc with the flange 83 and disc 82 being defined as a single-piece construction. The flange 83 enables the plug 81 to be fixed in position against the inside surface of tubular support 40 as shown at 84 by any suitable means, such as welding, for example. The disc 82 has a circular thermally insulating member in the form of an insulating disc 85 suitably fixed to its upstream end. The plug 81 further assures that engine exhaust gaes do not leak into the inner tubular support 40.

The outer tubular support 42 has an increasing circular area in the direction of exhaust gas flow and such tubular support 42 has a substantially frustoconical configuration throughout the major portion of its axial length 86 and in this example the aft portion of such axial length is a frustoconical portion 87. The outer tubular support 42 comprises a rapidly outwardly flaring portion 90 which blends smoothly with the frustoconical portion 87 whereby the portions 90 and 87 of this example are defined as a single-piece construction whereby the outer tubular support 42 is a single-piece construction. The outer tubular support 42 has an upstream diameter indicated at 92 which is equal to the diameter of the engine at the engine exhaust flange or annular mounting ring 25 and the outwardly flaring portion 90 is of circular cross-sectional configuration and of comparatively rapidly increasing diameter in the direction of exhaust gas fow.

The vane assembly 30 has an annular flange 93 of Substantially L-shaped cross-sectional configuration and is similar to the engine flange 25 and the flange 93 is adapted to be suitably fixed, as by welding, to portion 90 of the outer tubular support 42 and as indicated at 94. The flange 93 is particularly adapted to be placed in abutting relation with the previously described flange 25 and a suitable fastening ring 95 of roughly U-shaped cross-sectional configuration throughout the major portion thereof and of known construction is disposed concentrically about flanges 25 and 93 and fixed thereto holding such flanges in abutting relation. The flanges 25 and 93 together with the fastening ring 95 comprise the attaching means previously designated generally by the reference numeral 32 and provided for attaching the vane assembly 30 to the engine 21.

The vane assembly 30 has an axial length 86 as mentioned earlier and such length 86 is approximately equal to the upstream diameter 92 whereby there is a minimum overhang of the assembly 30 rearwardly of the attaching means 32; and, the vane assembly 30 has a center of gravity which is roughly midway along the axial length 86 as measured parallel to the axis 41. Accordingly, the attaching means 32 serves as the sole support for the vane assembly, whereby the vane assembly 30 may be fixed to the gas turbine engine 21 solely by its attaching means 32 and without requiring additional structural components whereby the vane assembly 30 is of optimum versatility and may be mounted in various aircraft without special mounting structure being provided on the aircraft structure itself.

As previously mentioned each vane 34 has holes or apertures 50 in its opposed walls with each of the apertures 50 having an oblong cross-sectional configuration. The apertures 50 are disposed in the aft portion indicated at 98 of the aft wall portions 45 and 46 of each vane 34 (FIG. 9). It should also be highlighted that a plurality of apertures 50 are disposed in the trailing edge 100 of the substantially flattened crescent shape of the wall means 45 and 46 defining the passage 47. It should also be noted that the elongated dimension of the elongated apertures 50 is disposed approximately transverse the axis 41 and as indicated at 101 in FIG. 2.

The vane asssembly 30 has optimum compactness in that it has a small maximum envelope and a short axial length. Accordingly, such assembly 30 may be constructed with minimum weight.

The apparatus 22 suppresses infrared radiation emitted from hot metal parts in the aft end of the engine 21 and from the exhaust plume thereof during engine operation with minimum penalty to the engine 21 and in a typical application such as the one illustrated, the engine power loss due to the apparatus and method of this invention is generally of the order of 2% and less.

As previously mentioned, each second passage 55 of each vane 34 has an outlet opening 56 which has a slightly decreasing width 57 radially inwardly along the height of its vane and this is highlighted at 102 in FIG. 7 of the drawings. However, it will be appreciated that the outlet 56 need not necessarily be of slightly decreasing width but may decrease comparatively more rapidly in width, as indicated at 103 in FIG. 7A, from the outer tubular support 42 to the inner tubular support 40. Similarly, the second passage 55 in each vane 34 may have an outlet opening 56 which increases in width from the outer tubular support 42 to the inner tubular support 40, as indicated at 104 in FIG. 7B. Further, it will be appreciated that the outlet opening 56 may be of uniform width along its full radial height.

Figure 7A:
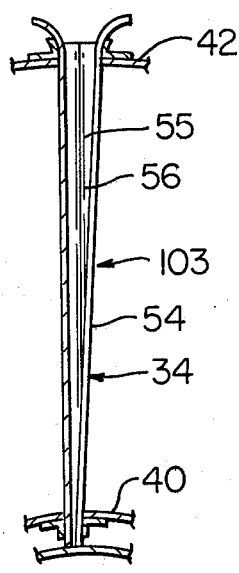
FIG. 7A is a view similar to FIG. 7 illustrating a typical vane assembly having a modified second passage which has a modified outlet opening.
Figure 7B:
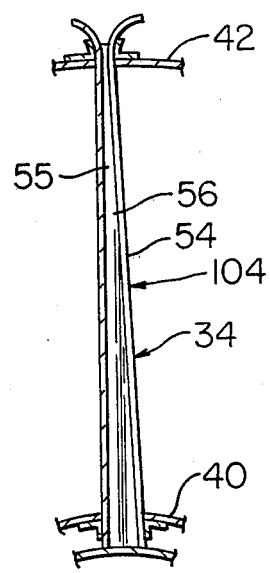
FIG. 7B is a view similar to FIG. 7 illustrating a typical vane assembly having another modified second passage which has another modified outlet opening.

The outlet opening 56 of the second passage 55 regardless of whether it is of slightly radially inwardly decreasing width as shown in FIG. 7, of more rapidly decreasing width as shown in FIG. 7A, or of increasing width as shown in FIG. 7B is defined by the adjustable leg portion 54 of its associated V-shaped forward portion 51. In this disclosure each vane 34 is made as a single-piece construction whereby the second passage 55 and its outlet opening is determined depending upon the application of the apparatus 22 and is in essence adjustably determined and once thus determined its leg portion 54 is held in a fixed position on the vane assembly by an associated L-shaped flange 67 and as shown in FIGS. 5 and 6.

A plurality of jet-like streams of cooling ambient air are defined by the apertures 50 and as explained earlier such streams cooperate, i.e., flow along their vanes 34, and, in essence, define a pair of radially extending blankets of cooling ambient air on opposite sides of each vane. Each radial blanket is initially disposed between the inner tubular support 40 and the outer tubular support 42; however, the radially disposed or extending blankets are given a spiral swirl by the vanes 34 to provide a mixing action within the vane assembly 30 and downstream thereof and thereby provide a cooled mixture M of exhaust gases and cooling ambient air which exits the aft assembly 30 and such cooled mixture is sufficiently cool that it cannot be detected by heat seeking missiles. Further, the streams of cooling ambient air serve to cool the hot metal of the duct structure sufficiently so that it cannot be detected by a heat seeking missile.

Each vane 34 is made from a single piece of sheet metal as indicated previously and, in general, such metal is of substantially uniform thickness throughout its cross section. However, it will be appreciated that in certain applications of this invention it may be desired to make each vane 34 employing heat transfer surfaces, or the like, as a part thereof to increase the efficiency of heat transfer between the hot gases, the metal itself, and the cooler ambient air.

The infrared radiation suppressor or apparatus 22 of this invention is of fixed construction and thus free of moving parts, i.e., parts such as pumps, for example, which must ordinarily be driven to provide cooling air flow; however, as explained earlier, the second passage 55 in each vane 34 may be designed to receive more or less cooling air therethrough and introduce more or less air at the upstream end of the vane assembly 30. In addition, each passage 55 may have a discharge opening 56 such that cooling ambient air is provided approximately uniformly along the radial height of its vane 34 with more cooling ambient air adjacent the peripheral outer edge of each vane as illustrated in FIG. 7, considerably more cooling ambient air is provided adjacent the peripheral outer edge of each vane 34 as shown in FIG. 7A, or more cooling ambient air is provided adjacent the inner tubular support 40 of each vane than adjacent its peripheral outer edge as shown in FIG. 7B. Accordingly, it will be seen that with the apparatus 22 being free of moving parts it operates at all air flows with minimum likelihood of malfunction.

The vanes 34 of the assembly 30 are substantially identical and of simple construction and may be readily replaced individually in case of damage to a particular vane. Further, the vanes 34 about the entire periphery of the apparatus 22 are completely interchangeable.

The apparatus 22 and in particular the vane assembly 30 provides optimum hiding of hot metal parts of the gas turbine engine 21 while imparting a spiral twist to the cooling air and hot exhaust gas. Further, because of the configuration of the curved wall means of the vanes 34 there is optimum hiding of hot metal parts as indicated by the line of sight 105 in FIG. 10 of the drawings with such line of sight being substantially parallel to the longitudinal axis 41. It will be appreciated that any other line of sight not parallel to the axis 41 provides even greater hiding by the vane assembly 30 of the hot metal parts of the engine 21.

The entire vane assembly 30 is symmetrical about the axis 41 and may be mounted at any radial position by the use of the flanges 25, 93, and the support ring 95. Further, the actual size of the vane assembly 30 will vary depending upon the size of the engine on which it is used.

While present exemplary embodiments of this invention, and methods of practicing the same, have been illustrated and described, it will be recognized that this invention may be otherwise variously embodied and practiced within the scope of the following claims.

What is claimed is:

1. An apparatus for suppressing infrared radiation emitted from hot metal parts at the aft end of a gas turbine engine and from the exhaust gas plume thereof during engine operation comprising a multiple purpose ejector vane assembly for introducing cooling ambient air into the hot engine exhaust gases and hiding said hot metal parts and means attaching said vane assembly to said engine, said vane assembly comprising, a duct structure for receiving and confining said engine exhaust gases, and a plurality of radial ejector vanes supported by said duct structure for hiding said hot metal parts and introducing cooling ambient air into hot engine exhaust gases during engine operation by ejector action while simultaneously imparting a spiral swirl to both said cooling ambient air and said exhaust gases, said swirl promoting mixing of ambient air within said duct structure and causing additional entrainment of ambient air downstream of said duct structure, said duct structure comprising an inner tubular support having a central longitudinal axis and an outer tubular support disposed concentrically about said inner support and having an axis common with said central axis, said inner tubular support having means sealing the center thereof from engine exhaust gases and cooling ambient air, each of said plurality of radial vanes being supported by said tubular supports and comprising cooperating curved wall means which provide said hiding of hot metal parts and impart said spiral swirl, each of said plurality of radial vanes having independent cooling ambient air inlet means disposed outwardly of said outer tubular support and communicating directly with ambient air, said plurality of inlet means introducing said cooling ambient air into said radial vanes by said ejector action, said curved wall means of each vane having single-thickness aft wall portions in the direction of exhaust gas flow which cooperate to define a passage disposed transverse said axis for receiving said cooling ambient air therethrough from an associated cooling ambient air inlet means, each of said aft wall portions having a plurality of apertures therein with each aft wall portion and its aperatures upon being subjected to engine exhaust gases being the sole means providing withdrawal of cooling ambient air from within its passage by said ejector action for mixing thereof with said exhaust gases, each of said aperatures in a single-thickness aft wall portion serving to produce a low pressure area in the vicinity thereof which introduces a jet-like stream of cooling ambient air into said exhaust gases, said aperatures defining a plurality of jet-like streams associated with a particular aft wall means of a particular vane which cooperate to define a radially extending blanket of cooling ambient air, each of said blankets due to said sealing means being initially disposed between said inner tubular support and said outer tubular support.

2. An apparatus as set forth in claim 1 in which said aft wall portions of each vane cooperate to define said transverse passage having a roughly flattened crescent shape at each cross-section thereof parallel to said axis, said transverse passage decreasing in area as each of said cross sections approaches said axis.

3. An apparatus as set forth in claim 1 in which each of said vanes has opposed end portions thereof inwardly of its opposite ends supported by said tubular supports.

4. An apparatus as set forth in claim 1 in which said curved wall means of each vane comprise a single-thickness roughly V-shaped forward wall portion, each V-shaped portion having an apex which is convex toward said engine and a first leg adjoining said apex and its associated aft wall portion and a second leg which is adjustably fixed to define a second passage in each vane for introducing said cooling ambient air therethrough from an associated cooling ambient air inlet means, each second passage having an outlet opening along the full radial height of its vane, each of said forward wall portions and its associated outlet opening upon being subjected to engine exhaust gases being the sole means providing withdrawal of cooling ambient air through said associated outlet opening by said ejector action.

5. An apparatus as set forth in claim 4 in which said V-shaped forward wall portion of each vane has outwardly flaring inlet flanges for smooth introduction of cooling ambient air in the second passage.

6. An apparatus as set forth in claim 4 in which said second passage of each vane has said outlet opening which increases in width from said outer tubular support toward said inner tubular support.

7. An apparatus as set forth in claim 4 in which said second passage of each vane has said outlet opening which decreases in width from said outer tubular support towards said inner tubular support.

8. An apparatus as set forth in claim 1 in which each of said aperatures has a substantially oblong configuration with the elongated dimension thereof being disposed approximately transverse said axis.

9. An apparatus as set forth in claim 1 in which said outer tubular support has an increasing circular area in the direction of exhaust gas flow.

10. An apparatus as set forth in claim 9 in which said outer tubular support has a substantially frustoconical configuration throughout the major portion of its axial length.

11. An apparatus as set forth in claim 9 in which said inner tubular support has a substantially right circular cylindrical configuration.

12. An apparatus as set forth in claim 10 and further comprising a plug for said inner tubular support which prevent leakage of engine exhaust gases therein.

13. An apparatus as set forth in claim 1 in which said outer tubular support has an upstream diameter which is equal to the diameter of said engine downstream of its turbine and has an increasing diameter in the direction of exhaust gas flow with said inner tubular support having a cylindrical configuration, and said vane assembly has an axial length which is approximately equal to said upstream diameter and a center of gravity which is roughly midway along said axial length and said attaching means is the sole support for said vane assembly.

14. An apparatus as set forth in claim 13 in which said attaching means comprise, a first annular flange of L-shaped cross section fixed to said outer tubular support, a second annular flange of L-shaped cross section fixed to said engine and an annular clamp of roughly U-shaped cross section holding said flanges together in a fixed manner.

15. An apparatus for suppressing infrared radiation emitted from hot metal parts at the aft end of a gas turbine engine and from the exhaust gas plume thereof during engine operation comprising; a multiple purpose ejector vane assembly; and means attaching said vane assembly to said engine; said ejector vane assembly comprising, an inner tubular support having a central longitudinal axis, said inner tubular support having means sealing the center thereof from engine exhaust gases and cooling ambient air, an outer tubular support disposed concentrically around said inner support and having an axis common with said central axis, and a plurality of contoured vanes arranged in a radial pattern about said inner tubular support and being supported in a beam-like manner between and by said tubular supports, said radial vanes serving the three fold purpose of introducing cooling ambient air into hot engine exhaust gases during engine operation by ejector action, hiding hot engine parts, and imparting a spiral swirl to both said cooling ambient air and said exhaust gases with said swirl promoting rapid mixing of ambient air within said duct structure and causing additional entrainment of ambient air downstream of said duct structure, each of said plurality of radial vanes having independent cooling ambient air inlet means disposed outwardly of said outer tubular support and communicating directly with ambient air, said inlet means introducing said cooling ambient air into said radial vanes by said ejector action, each of said plurality of radial vanes comprising cooperating curved wall means having single-thickness aft wall portions which cooperate to define a first passage disposed transverse said axis for receiving cooling ambient air therethrough from an associated cooling ambient air inlet means, each of said aft wall portions having a plurality of aperatures therein with each aft wall portion and its aperatures upon being subjected to engine exhaust gases being the sole means providing withdrawal of cooling ambient air from within its passage by said ejector action for mixing thereof with said exhaust gases, said curved wall means of each radial vane comprising a single-thickness roughly V-shaped forward wall portion, each V-shaped portion having an apex which is convex toward said engine and a first leg adjoining said apex and being fixed to its associated aft wall portion, each V-shaped portion having a second leg which is adjustably fixed to define a second passage in each radial vane for introducing cooling ambient air therethrough from an associated cooling ambient air inlet means, each second passage having an outlet opening along the full radial height of its radial vane, each of said forward wall portions and its associated outlet opening upon being subjected to engine exhaust gases being the sole means providing withdrawal of cooling ambient air through said associated outlet opening by said ejector action.

16. An apparatus as set forth in claim 15 in which said aft wall portions of each vane cooperate to define its transverse passage having a roughly flattened crescent shape at each cross section thereof parallel to said axis.

17. An apparatus as set forth in claim 16 in which the transverse passage of each vane decreases in area as each of said cross sections thereof approaches said axis.

18. An apparatus as set forth in claim 15 in which each of said vanes has opposed end portions thereof inwardly of its opposite ends supported by said tubular supports in said beam-like manner.

19. An apparatus as set forth in claim 15 and further comprising a plug for said inner tubular support which prevents leakage of engine exhaust gases therein.

20. An apparatus as set forth in claim 19 in which said plug has a layer of thermally insulating material fixed against an upstream surface thereof.

21. An apparatus as set forth in claim 15 in which said outer tubular support has an upstream diameter which is equal to the diameter of said engine downstream of its turbine and has an increasing diameter in the direction of exhaust gas flow with said inner tubular support having a cylindrical configuration, and said vane assembly has an axial length which is approximately equal to said upstream diameter and a center of gravity which is roughly midway along said axial length and said attaching means is the sole support for said vane assembly.

22. An apparatus as set forth in claim 15 in which said attaching means comprise, a first annular flange of L-shaped cross section fixed to said outer tubular support, a second annular flange of L-shaped cross section fixed to said engine, and an annular clamp of roughly U-shaped cross section holding said flanges together in a fixed manner.

23. A method of suppressing infrared radiation emitted from hot metal parts at the aft end of a gas turbine engine and from the exhaust gas plume thereof during engine operation comprising the steps of; attaching a multiple purpose ejector vane assembly to the aft end of said engine for receiving hot engine exhaust gases and hiding said hot metal parts, said vane assembly having a duct structure for receiving and confining said engine exhaust gases and having a plurality of radial ejector vanes, said duct structure having an inner and an outer tubular support and said radial vanes being supported therebetween, each of said plurality of radial vanes being supported by said tubular supports and comprising single-thickness cooperating curved wall means, each of said plurality of radial vanes having independent cooling ambient air inlet means disposed outwardly of said outer tubular support and communicating directly with ambient air; introducing cooling ambient air into said hot engine exhaust gases during engine operation solely by ejector action through the plurality of independent cooling ambient air inlet means; sealing the center of said inner tubular support from engine exhaust gases and cooling ambient air; and imparting a spiral swirl to both said cooling ambient air and said exhaust gases using said ejector vanes and simultaneously with the introduction of said cooling ambient air, said swirl promoting mixing of said ambient air within said duct structure and causing additional entrainment of ambient air downstream of said duct structure, said introducing step comprising introducing cooling ambient air in a plurality of radially extending blankets disposed between said tubular supports, each of said plurality of radially extending blankets being defined by cooling ambient air independently supplied from ambient air through associated air inlet means to an associated radial ejector vane.

24. A method as set forth in claim 23 in which said step of imparting said spiral swirl comprises imparting said swirl which increases in diameter in the direction of exhaust gas flow.

25. A method as set forth in claim 23 in which said introducing step further comprises introducing cooling ambient air in said plurality of said blankets each comprised of a plurality of cooperating jet-like air streams.

* * * * *